Figure 1:
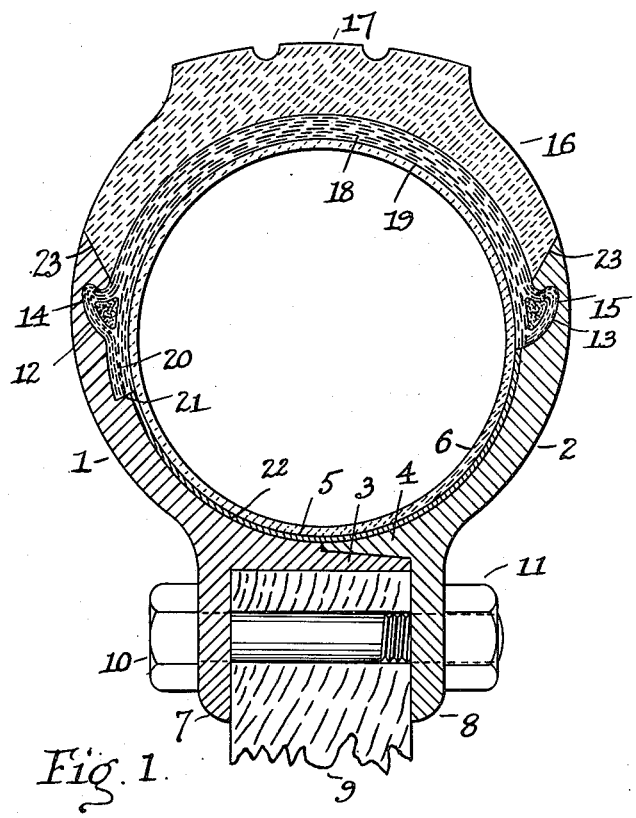

Aug. 5, 1924.

J. W. BRYANT 1,503,976

WHEEL RIM AND PNEUMATIC TIRE COVER

Filed Sept. 22, 1920

Inventor:
John W. Bryant
By Wm. E. Boetter,
attorney

Patented Aug. 5, 1924.

1,503,976

UNITED STATES PATENT OFFICE.

JOHN WALTERS BRYANT, OF SHEPPARTON, VICTORIA, AUSTRALIA, ASSIGNOR OF ONE-TWELFTH TO CHARLES WILLIAM BRYANT, ONE-TWELFTH TO CHARLES JAMES BRYANT, ONE-SIXTH TO MARGARET ELIZA BRYANT, AND ONE-SIXTH TO WILLIAM SHEIL, ALL OF SHEPPARTON, VICTORIA, AUSTRALIA.

WHEEL RIM AND PNEUMATIC-TIRE COVER.

Application filed September 22, 1920. Serial No. 412,045.

*To all whom it may concern:*

Be it known that I, JOHN WALTERS BRYANT, a subject of the King of Great Britain and Ireland, residing at High and Welsford Streets, Shepparton, in the State of Victoria, Australia, have invented certain new and useful Improvements in Wheel Rims and Pneumatic-Tire Covers; and I do hereby declare the following to be a full, clear, and exact description of the invention, such as will enable others skilled in the art to which it appertains to make and use the same.

This invention relates to parts of vehicle wheels which enclose inflatable pneumatic tubes, or similar inner members. It is customary for enclosing parts to comprise a rim of metal or rigid material, and a cover or casing of rubber and canvas or flexible material. Casings are apt to become punctured or to wear out during use, and this invention provides an improved rim and an improved casing having the following characteristics:—The arc of the casing is as small as is consistent with the resiliency which is required, so that relatively little puncturable surface is exposed; the casing tread will stand long wear; blow outs can seldom occur; full inflation is easy to maintain; assembling of the casing and inner tube is easy without risk of pinching the inner tube; if the tread flattens somewhat owing to load or to under-inflation, the inner tube remains protected to a large extent; and the weight the tread can carry exceeds that supportable by casings mounted around relatively small wheel rims. This invention is not however broadly the employment of a deep channel for the inner tube, nor the employment of a shallow casing, but is as claimed at the end of this specification, and an embodiment of the invention is illustrated in the drawings herewith. The invention is not, however, limited to the designs, proportions of parts, or minor details shown.

Figure 2:
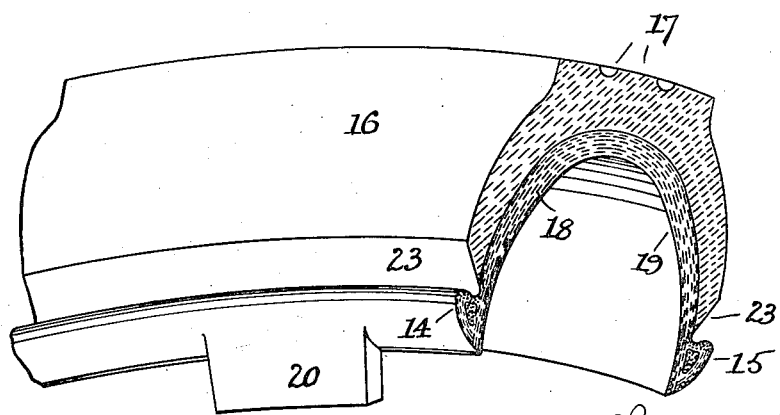

In the drawings Figure 1 shows a tire in transverse section and Figure 2 is a perspective view of part of its casing.

The rim has separable circular cheeks or sides 1, 2, which fit together and are fixed to a wood or like suitable felloe 9 by having flanges 7, 8, to fit against the felloe, and be fixed there by through bolts 10 (having nuts or the like 11) spaced around the flanges.

The two oppositely set cheeks which form the wheel rim have tongues 3, 4, which fit together and overlap or are likewise detachably connected the cheeks forming a circular channel 5 of, in cross section, arcuate contour, semicircular or approximately so, for the inner tube 6 to fit into when inflated.

A thin sheet 22 of canvas or the like, may be located between tube 6 and its channel 5 as a lining to protect the tube, as from rust.

The metal or like unpuncturable channel walls allow in my preferred construction slightly less than half the inner tube to project above the tops of the walls, the remainder, that is preferably more than half, being protected by the said walls. Each cheek or wall has around its outer edge a circular recess 12 or 13 (on the inner side, that is in the channel 5) which receives the circular beaded edge, 14 or 15, of the casing 16, having any desired tread 17 for road wear, and shown as having its inner part of canvas 18, but its composition forms no part of this invention; it is simply a resilient, durable, and strong casing which contains an arcuate channel 19, whereby the casing is seated on and fits the inner tube when the latter is inflated. Owing to the beaded part of the casing underlapping the walls or cheeks the channel 19, will, in transverse section, equal or exceed a semicircle, the latter being the construction deemed most satisfactory.

It is important to prevent creeping of the casing circumferentially, as such would injure or strain the inner tube, and it will, in some cases, be useful to extend the amount of cover surface engaged with the rim surfaces.

Therefore projections 20 are provided at suitable intervals around one or both beaded edges of the casing, and one (or both) cheeks has (or have) corresponding recesses 21, into which the projections are fitted or forced by being somewhat compressed so as to secure a firm hold.

Rims of existing wheels can be removed and the wheels may be converted to possess the construction herein described. Cheek 1 which covers the whole periphery of felloe 9 may be shrunk on, and when the detachable cheek 2 is bolted on, the original removed rim will have been superseded by the substitute hereinbefore described.

The edges 23 of the casing above the beads in the construction found most desirable, extend obliquely as in Figure 1 or may be curved, so as to fit against corresponding rim surfaces, which are protective of the said parts 23.

What I claim is:—

A vehicle wheel rim comprising two circular cheeks, each of arcuate form in cross-section and adapted to be mounted upon a wheel felloe and when so mounted to provide a channel of arcuate form in cross-section to receive a pneumatic tube, said cheeks having flanges 7 and 8 respectively to seat against the sides of the felloe and also having co-operating tongues 3 and 4 respectively, the tongue 3 extending entirely around the periphery of the felloe and seated thereupon, and said cheeks being each provided with a circular recess with which one edge of a tire casing is adapted to engage, one of said cheeks being also provided at intervals upon its inner curved wall with recesses adapted to receive projections on the tire casing.

In witness whereof I have hereunto set my hand.

JOHN WALTERS BRYANT.